United States Patent [19]
Kaneko

[11] Patent Number: 5,295,475
[45] Date of Patent: Mar. 22, 1994

[54] HEATING DEVICE

[75] Inventor: Gentoku Kaneko, Takarazuka, Japan

[73] Assignee: Japan Warmer Inc., Kobe, Japan

[21] Appl. No.: 465,242

[22] PCT Filed: Sep. 17, 1988

[86] PCT No.: PCT/JP88/00947
§ 371 Date: May 24, 1991
§ 102(e) Date: May 24, 1991

[87] PCT Pub. No.: WO89/02240
PCT Pub. Date: Mar. 23, 1989

[30] Foreign Application Priority Data
Sep. 17, 1987 [JP] Japan ................... 62-141919
Dec. 10, 1987 [JP] Japan ................... 62-188624
Jan. 21, 1988 [JP] Japan ................... 63-122205

[51] Int. Cl.$^5$ .................................................. F24J 1/00
[52] U.S. Cl. .................................. 126/263 R; 126/246;
126/261; 126/262; 230/201
[58] Field of Search ............... 126/263, 204, 205, 206,
126/262, 264, 261, 246; 220/201

[56] References Cited
U.S. PATENT DOCUMENTS

| | | | |
|---|---|---|---|
| 3,871,357 | 3/1975 | Grosso et al. | 126/263 |
| 4,730,601 | 3/1988 | Hubele et al. | 126/263 |
| 4,762,113 | 8/1988 | Hamasaki | 126/263 |
| 4,771,761 | 9/1988 | Doukhan et al. | 126/263 |
| 4,867,131 | 9/1989 | Van der Merwe et al. | 126/263 |

FOREIGN PATENT DOCUMENTS 108157  5/1988  Japan ................. 126/263

*Primary Examiner*—Larry Jones

[57] ABSTRACT

In a heating device, a material is heated by heat from a hydration reaction with an exothermic material and water. A container for the material heated is provided above a container for the exothermic material and has a number of apertures at a bottom wall of the portion for containing the material to be heated. The apertures spout vapor of a high temperature generated by the heat of hydration reaction with the exothermic material and water to the inside of the container for the material to be heated so that the vapor of high temperature is added to the material to be heated from right below the material to be heated in addition to conductive heat transferred through a wall of the portion for containing the material to be heated.

16 Claims, 6 Drawing Sheets

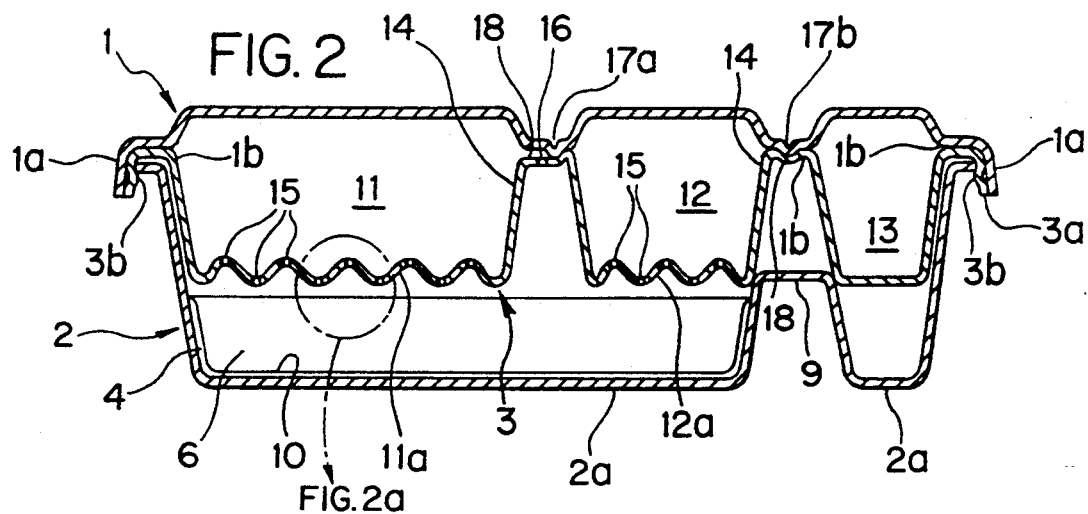
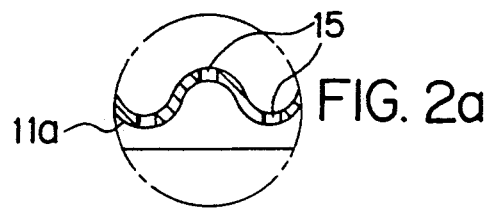
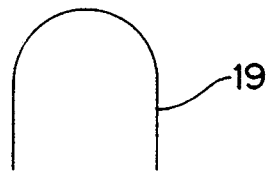
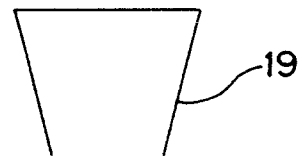
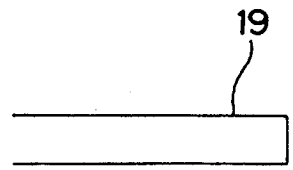

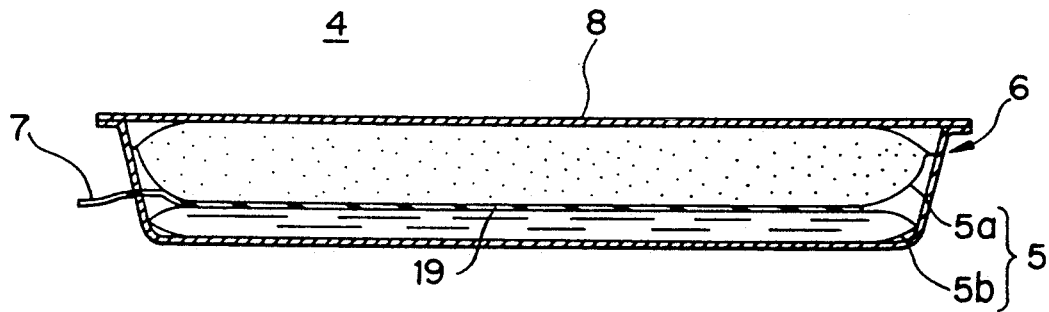
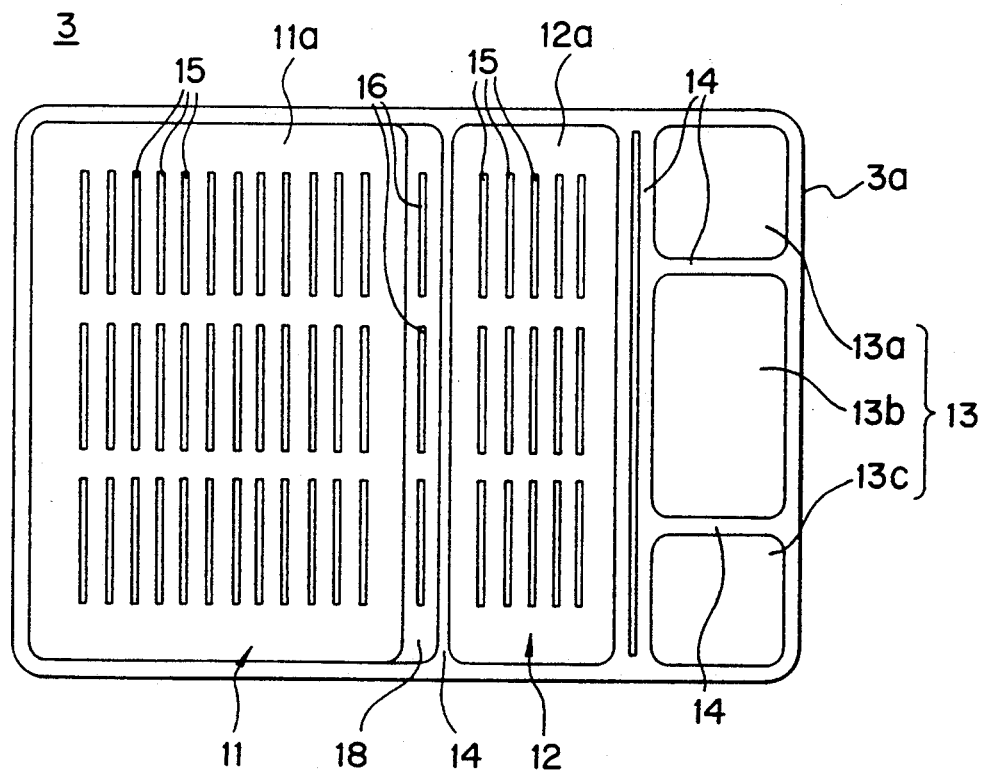

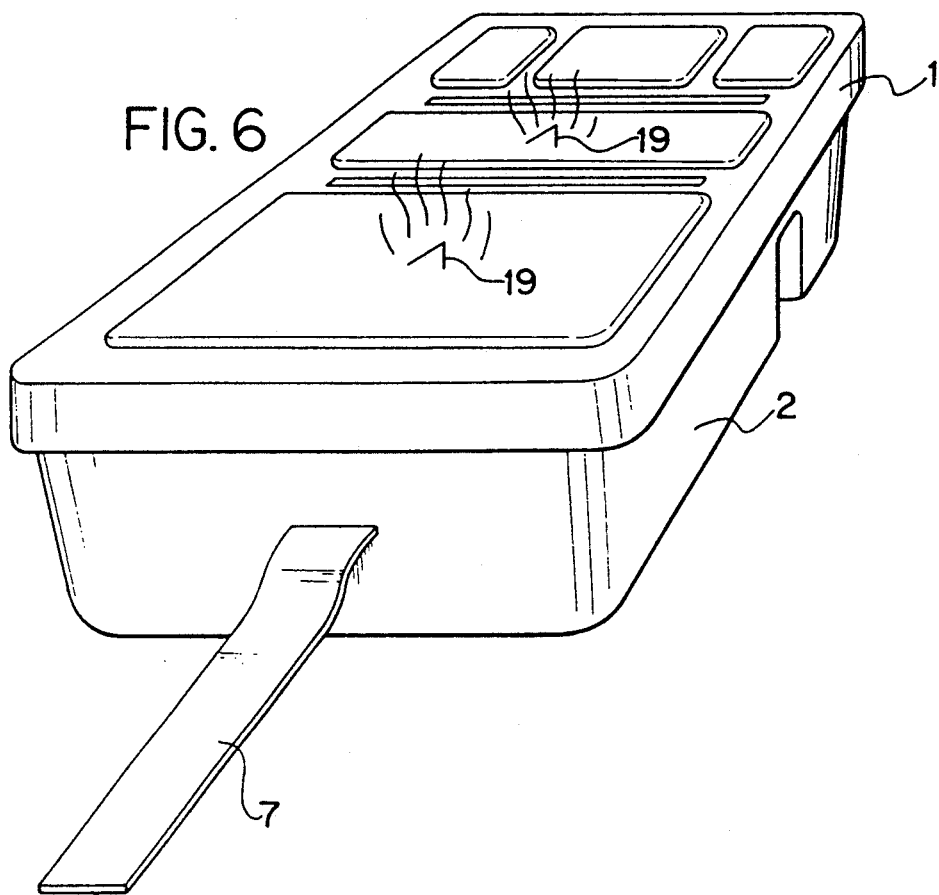
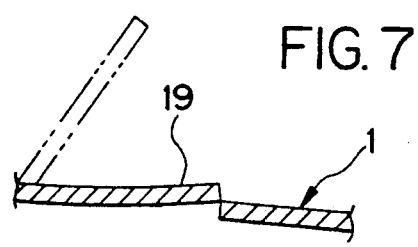

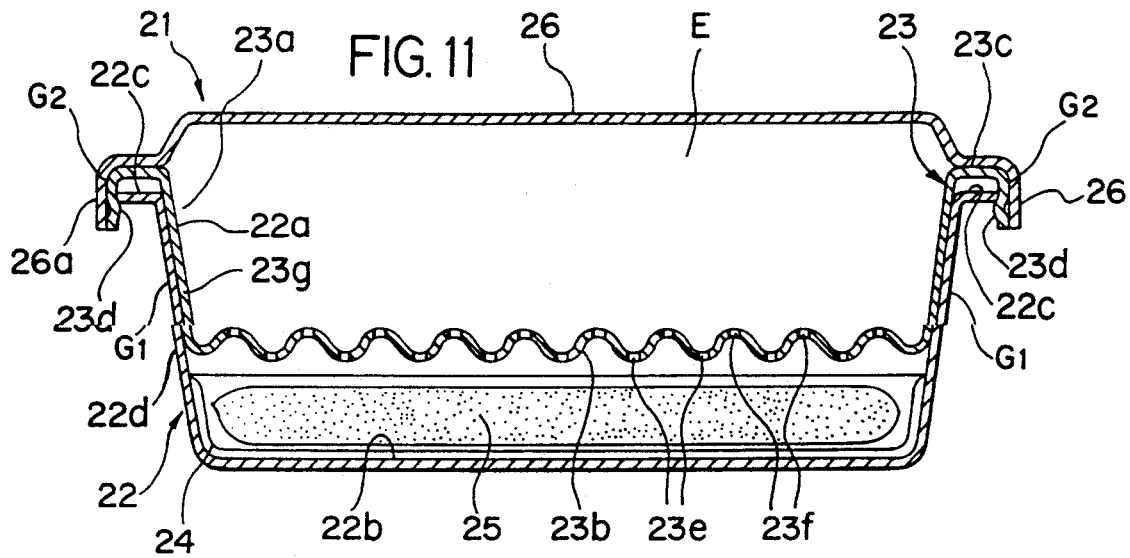
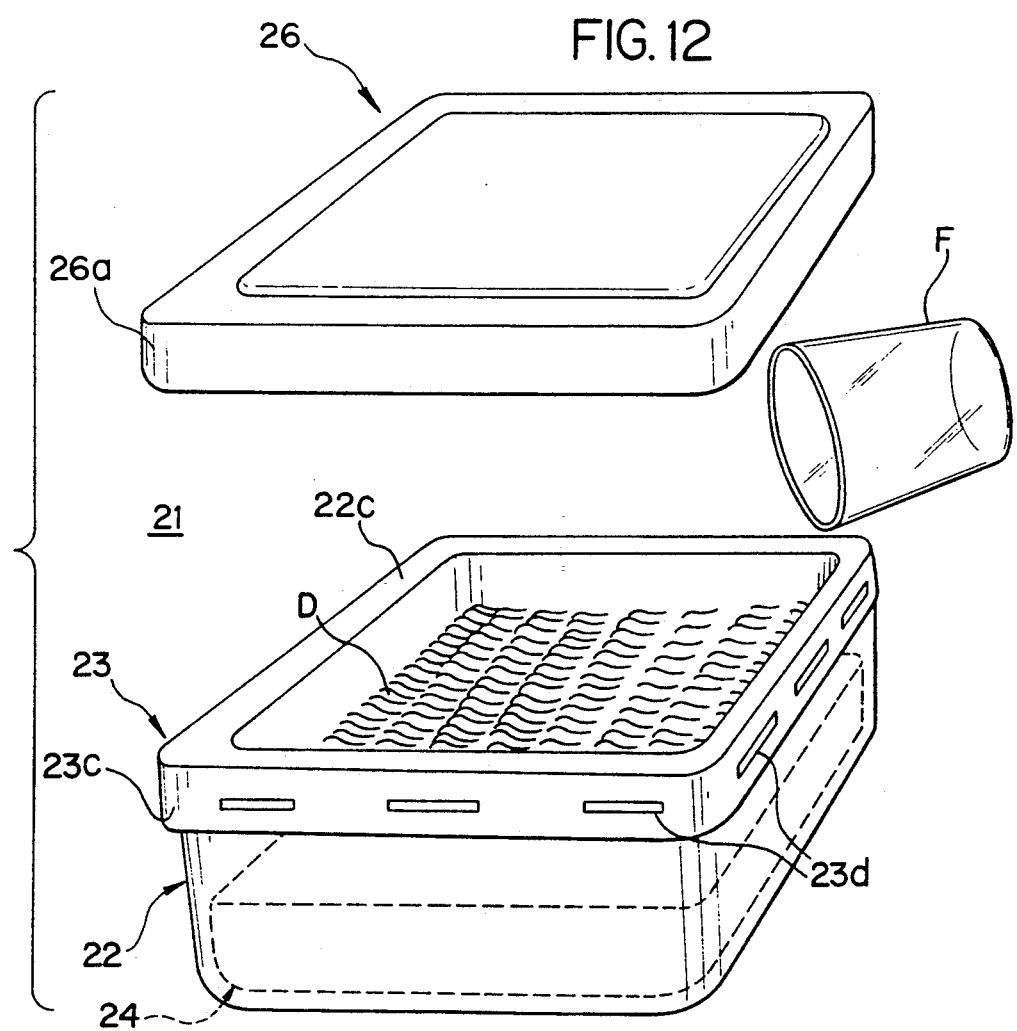

HEATING DEVICE

FIELD OF THE INVENTION

The present invention relates to a heating device which make a material to be heated by heat of hydration reaction of an exothermic material and water.

BACKGROUND OF THE INVENTION

As a heating device for easily heating drinks such as coffee, tea and so forth or cooked foods, there have been provided heating devices which use by heat of hydration reaction between an exothermic material and water.

However, in these conventional heating devices, as seen in, for example, Japanese patent publication (kokai) No. 62-16371 and 61-259974, and Japanese utility model publication (kaukoku) No. 62-32500, European patent publication No. 3231513, Japanese utility model publication (koukai) No. 61-35, a portion for containing a material to be heated and a exothermic part are parted by a partion wall or walls of container and the material to be heated is heated only by conductive heat transferred therethrough. As a result, therefore, a part of the material to be heated contacting with the wall is heated to a high temperature, while other parts distant from tile wall can not be heated until they reach a sufficient temperature. Especially, in the case when a material to be heated is a solid, this tendency becomes remarkable; that is, the part in contact with the wall is scorched but an inner temperature is not raised sufficiently.

The heating devices, described in Japanese utility model publication (koukai) Nos. 62-123742 and 61-137318, have an aperture at a bottom wall. The vapor produced by heat of hydration reaction can heat the materials to be heated without causing uneveness of temperature, as described above.

In the heating devices described in Japanese utility publication (koukai) Nos. 62-123742 and 61-137318, it is a problem that small pieces of the exothermic material may be attached to the material to be heated together with the vapor of high temperature through apertures of the portion for containing the material to be heated.

The object of the present invention is to provide heating device in which small pieces of the exothermic materials spattered by reaction of the exothermic material and water does not tend to attach to the material to be heated.

Then, the heating device described above is one in which the exothermic material and water after hydration reaction are mounted with unremoved off, as disclosed in Japanese patent publication (koukai) No. 62-16371, and one in which exothermic materials or a bag containing the exothermic materials is directly included, as Japanese utility model (koukai) No. 61-137318, the device, after having made hydration reaction of the exothermic materials could not be reused.

The other object of the present invention is to provide a cartridge-type heating device comprising portion a for containing the exothermic materials, which is applied to different styles of the heat devices, and also the heating devices are reusable.

DISCLOSURE OF THE INVENTION

The present invention is based on a heating device which consists of a bag containing water, a bag containing the exothermic materials which generate heats by contacting with water and an insulation container in which a sheet-type filter element which allows the vapor of high temperature to pass but prevents the exothermic material from passing is spread on an opening and a means for starting contact with the exothermic material and water operable from the outside of the insulation container.

Therefore, this filter element of the portion for containing the heating materials enables the vapor of high temperature caused by heating to go out of the portion, but it prevents pieces of the exothermic materials reacting with water from passing through the portion and thus the exothermic materials are not attached to the materials to be heated.

As described above, such a cartridge-type device is applied to different styles of the heat devices. If the portion containing the exothermic materials is exchanged after use, the heating device body can be reused many times.

It is preferable that a means for starting contact between water and exothermic materials is a tape-type one by which a bag containing water can be torn so that water may evenly contact with the whole exothermic materials.

It is desirable to place the portion for containing the material to be heated and the portion for containing the material in a container covered with a lid which can be opened and closed, since the material to be heated is also heated from the upper side due to the vapor of high temperature filled in the portion for containing the material to be heated.

On the other hand, it is desirable to provide a cut or slit to discharge outside vapor having entered in the portion for containing the material to be heated, since the vapor having decreased in temperature after the heating, which could remain in the portion for containing the material to be heated, will not heat any materials to be heated sufficiently, and produce a large quantity of dew inside of the lid, or blow off tile lid by the internal pressure. By providing such a cut, the vapor having decreased in temperature after heating the material to be heated is pushed out by new vapor produced afterwards through the cut, thus always keeping the portion for containing the material to be heated filled with the vapor of high temperature until the vapor production is stopped.

As an exothermic material, calcium oxide, magnesium chloride, calcium chloride, iron oxide and so on can be used, for example. This material will generate heat of hydration reaction by contacting with water. Calcium oxide is most preferred as it generates high heat of hydration reaction, and boils water in contact with it, thus producing a large quantity of vapor of a high temperature.

It is preferable that this portion containing the exothermic materials is placed at the lower of the portion for containing the material to be heated which bottom wall has apertures to-pass the vapor, so that the material to be heated is heated by the high temperature vapor spouting out from directly under the material to be heated, in addition to conductive heat transferred through a bottom wall, thus heated without causing uneveness of temperature and also, small pieces of the exothermic materials are not spattered, so that the material to be heated is polluted with the exothermic materials.

Anything can be used as a material to be heated as long as heating is necessary, although taste of cooked food is increased by re-heating. It is effective to place an uncovered material to be heated in the portion for containing the material to be heated, but in the case when a material to be heated is liquid such as soup, it is placed in a style of retort pack when contained in the portion for containing the material to be heated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 to 5 are explanatory views of a heating apparatus according to the preferred embodiment I of the present invention, in which;

FIG. 1 is a perspective view of the heating device;

FIG. 2 is a longitudinal-sectional view of the heating device;

FIG. 2A is an enlarged view of the slit apertures in the wavy bottom wall;

FIG. 3 is a perspective view of the heating device;

FIG. 4 is a longitudinal-sectional view of a portion for containing an exothermic material;

FIG. 5 shows a container;

FIGS. 6, 7, 8, 9 and 10 are explanatory views of a heating device according to the preferred embodiment II of the present invention, in which;

FIG. 6 is a perspective view of the heating device;

FIG. 7 is a sectional view of a cut; and

FIGS. 8, 9 and 10 are plan views showing other shapes of a cut.

FIG. 11 is a sectional view of embodiment III of the present invention;

FIG. 12 is a perspective view of embodiment III of the present invention.

DETAILED DESCRIPTION OF THE PREFERRED EMBODIMENTS

Figure 1:
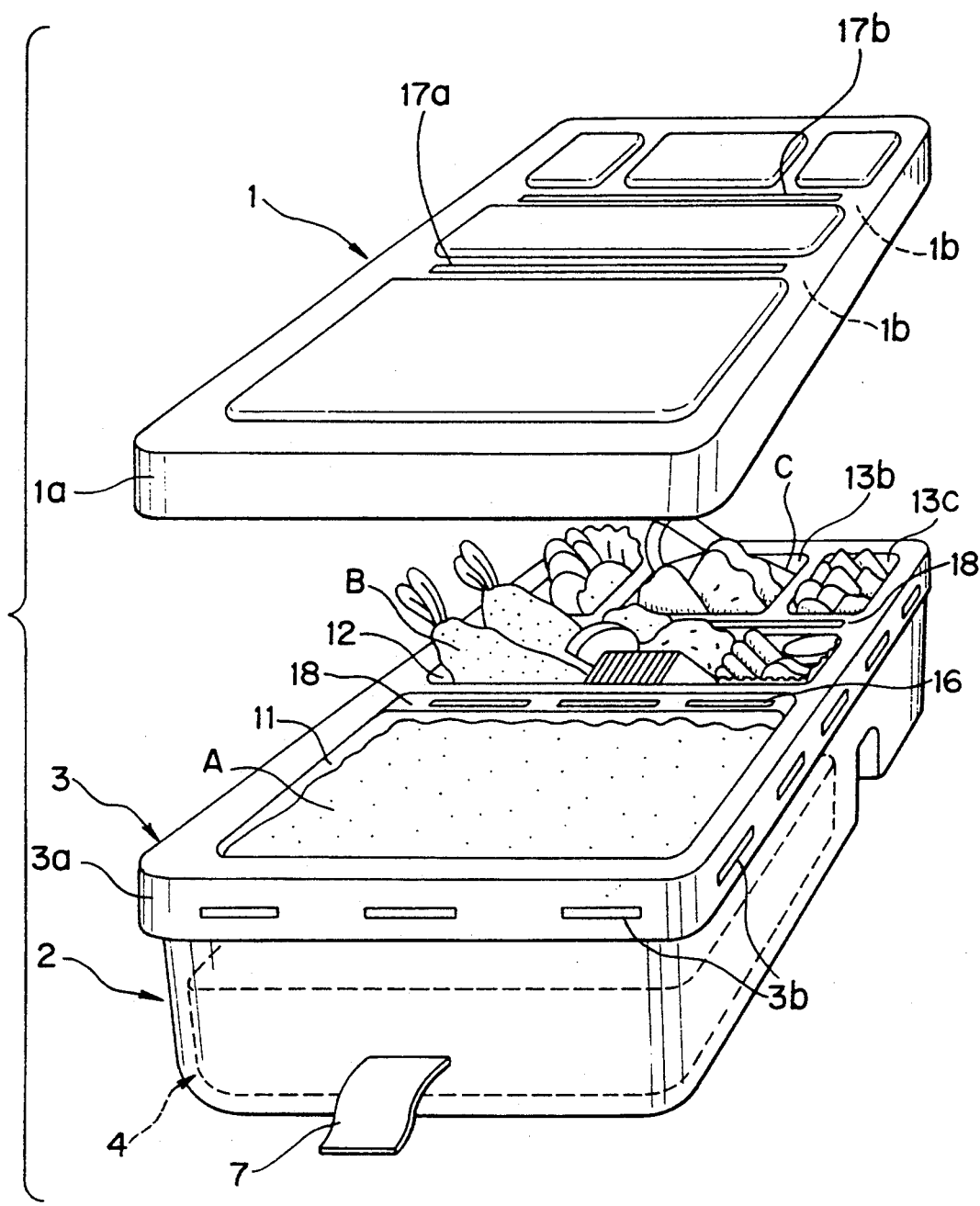

The tear element 7 is not limited to a tape-shape as described above, but it may be a sharp-pointed stick type. In this case, the water bag is broken by piercing it with the tear element from the opening.

The tear tape 7 may be deposited to both of the bag for the exothermic material 5a and the bag for water 5b so that both bags 5a and 5b can be broken at the same time.

The insulation container 6 prevents the exothermic source 5 and the container 2 from directly contacting with each other in order to prevent the container from melting or deformation by the heat generated from the exothermic source 5. The insulation container 6 is a flat box which has an opening at the top, inside of which the exothermic source 5 is contained. A sheet-type filter material 8 which allows the vapor of high temperature to pass but prevents small pieces of the exothermic material from passing through is spread on the upper opening. A nonwoven fabric may be used as the filter material 8.

The portion for containing the exothermic material 4 is a cartridge-type, and is contained in the container in a removable way, that is, the container can be reused by replacing a used container of the exothermic material 4 with an unused one. Moreover, the portion for containing the exothermic material 4 and the container 2 may be constituted in a body to be used in a disposable way.

Figure 3:
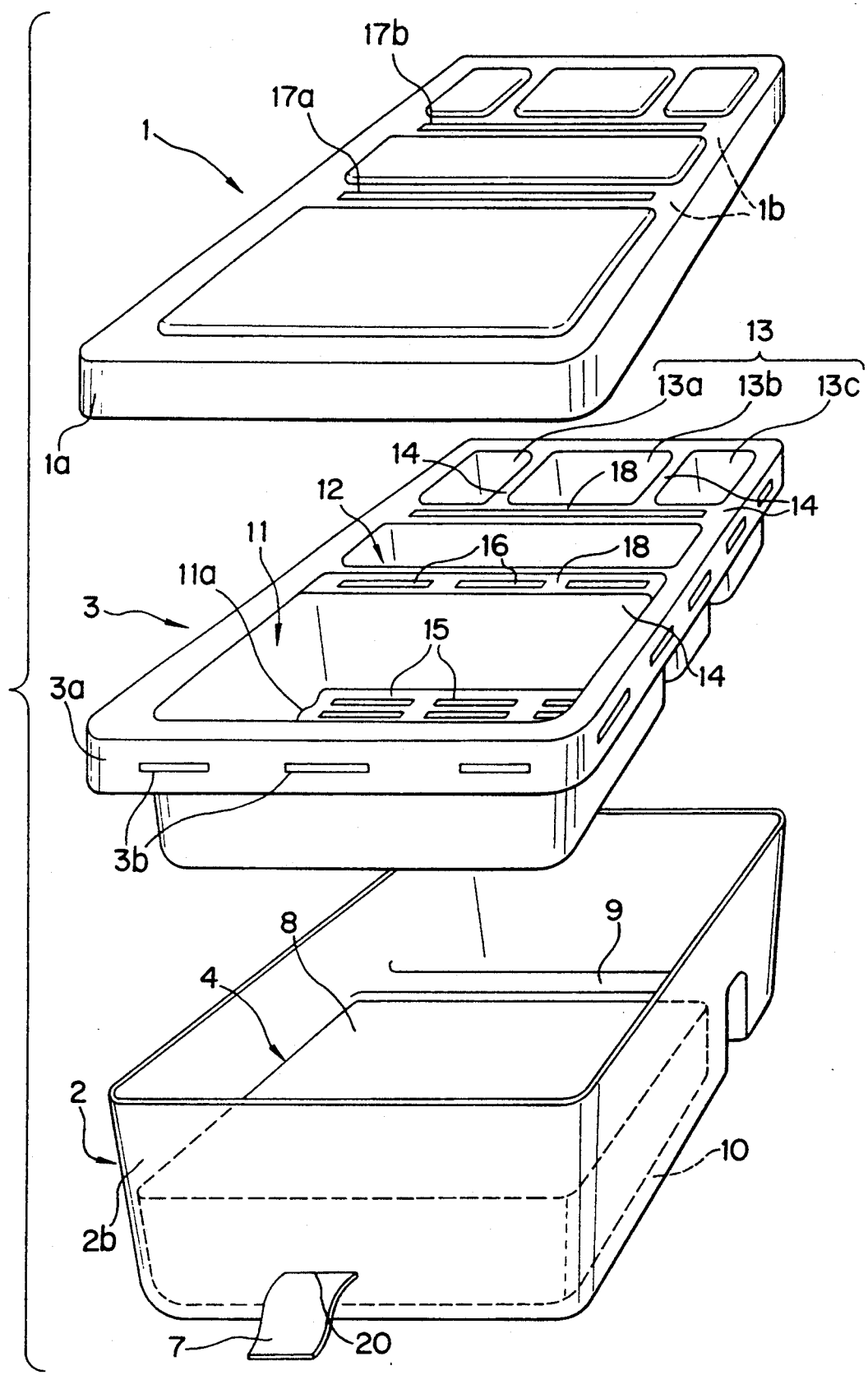

The container 2 is, as shown in FIG. 3, a flat cubic box having a released top and is made of styrene foam. At the bottom of the container 2, a partition 9 extruding inward from a bottom wall 2a is formed, thus partitioning and forming a portion 10 for containing the portion for containing the exothermic material 4.

The container 3 is made of plastic, formed in a body. The container 3 includes an engagement part 3a formed at the edge of the outside periphery of the container 3 to engage the container 3 to the outside periphery at the top of the opening of the container 2, and is partitioned by isolating walls 14 to form a first portion for containing a material to be heated 11, a second portion for containing a material to be heated 12, both located above the portion for containing the exothermic material 4, and a portion for containing an material not to be heated 13 located away from the portion for containing the exothermic material 4. Further, engagement ribs 3b are fixed in at a predetermined interval around the whole periphery of the engagement part 3a.

The portion for containing the material to be heated consists of the first container 11 to contain cooked rice A and the second container 12 to contain articles of other foods which require heating; in other words, which increase the taste thereof when heated. On the other hand, the portion for containing the material not to be heated is to contain fruit or articles of food which do not need the heating; that is, which taste better when they are cold. This is further partitioned three small containers 13a, 13b and 13c.

Concavities 18 and 18 to which respective partition ribs 17a and 17b of a lid 1 as described later are engaged are formed at the isolating wall 14 between the first container 11 and the second container 12 and the isolating wall 14 between the second container 12 and the portion for containing the material not to be heated 13, out of all the isolating walls 14.

As shown in FIG. 2, sections of respective bottom walls 11a and 12a of the portions for containing the materials to be heated 11 and 12 are formed in a wavy way, thus having larger surface area so as to make the heat conduction more effectively. Furthermore, as shown in FIG. 5, a number of slit-shaped apertures 15 are formed at a certain interval on the wavy bottom walls 11a and 12a to spout out the vapor of high temperature from downward into the portions for containing the materials to be heated 11 and 12. Moreover, at the top of the isolating wall 14 located between the first containing portion 11 and the second containing portion 12, a slit-shaped aperture 16 is formed to spout out the vapor of high temperature from upward into the first containing portion 11.

As shown in FIG. 2, when the container 3 is attached to the container 2, as the portion for containing the material not to be heated 13 is completely isolated from the portion 10 containing the insulation container 6 by the partition 9 of the container 2, it is ensusceptible to the exothermic reaction from the portion for containing the exothermic material 4.

The lid 1 to cover the container 2 is, similar to the container 3, made of plastic, formed in a body, having an engagement part 1a to engage the engagement part 3a of the container 3 at the edge of the outside periphery in a state in which the engagement part 1a covers with the engagement part 3a and inner surfaces 1b to be faced to the top of each isolating wall 14 of the container 3. At the inner surfaces corresponding to the isolating wall 14 between the first and second portions for containing the materials to be heated 11 and 12, and to the wall 14 between the second portion for containing the material to be heated and the portion for containing the material not to be heated 13, the above mentioned partition ribs 17a and 17b are provided. As shown in FIG. 2, the partition rib 17a facing to the concavity 18 of the isolating wall 14 between the first container portion 11 and the second container portion 12 is provided in such a manner as a facing part of the partition rib 17a is located at the outside (on the right side in FIG. 2) of an aperture 16 for spouting out the vapor of high temperature.

The present invention is explained in more detail in the attached drawings.

FIG. 1 through FIG. 5 show a heating device according to a first embodiment of the invention.

The heating device shown in the figures is a lunch box for Japanese food, in which a container for contents of food 3 for containing food as a material to be heated is provided inside of a container 2 which can be opened and closed by a lid 1, while a portion for containing an exothermic material 4 to heat the food is provided below the container 3, presenting a shape of a flat box.

As shown in FIG. 4, the portion for containing an exothermic material comprises an exothermic source 5 and an insulation container 6 for containing the source 5.

The exothermic source 5 consists of materials which generate heat by hydration reaction, concretely, of calcium oxide (CaO) and water. Although calcium oxide can be used as it is, it is better to pack it in a bag for easier handling, namely, the exothermic source 5 includes a bag for containing the exothermic material 5a containing calcium oxide and a bag for containing water 5b provided below the bag 5a. The bag for the exothermic material 5a is made of aluminium foil and a number of small holes is formed on the whole surface thereof, while the bag is filled with calcium oxide as an exothermic material. The bag for water 5b is made of a plastic film such as polyethylene and so on, which is filled with water, while a tear element 7 for the water bag 5b is provided on the upper surface thereof. The exothermic material bag may be made of a nonwoven fabric, as well as aluminum foil.

The tear element 7 has a tape-shape, having large tensile strength, and is deposited to the water bag 5b so that by pulling the tear element 7, the plastic film constituting the water bag 5b is torn in the direction of the extending of the plastic film, the width of which is relative to the width of the tear element. When the water bag 5b is broken, water enters inside of the bag 5a through the small holes of the bag for the exothermic material 5a, thus starting contact with the exothermic material.

An opening is provided at a side wall of the insulation container 6 and further, an opening 20 is provided at a side wall 2b of the container 2. The tear element 7 passes through these openings and the tip thereof can be seen from an outer wall of the container 2, so that the tear element 7 can be pulled from the outside of the container 2. Moreover, a mark showing a limit of the length to be pulled is provided midway on the tear element 7.

As described above, in this embodiment shown in the figures, the tape-shaped tear element 7, a means for starting contact with the exothermic material and water is extruded from the container 2 through the opening 20 at the side wall 2b of the container 2. Alternatively, it may extend from an aperture between the container 2 and the container 3 without providing the opening 20. Further, instead of providing the opening at the side wall of the insulation container 6, a cut may be provided at the upper edge of the side wall of the insulation container 6 so that the tear element 7 can pass through the cut.

Therefore, in the state in which the container 2 is covered with the lid 1, as the surfaces 1b are in contact with the top of each isolating wall 14b the portions for containing the materials to be heated 11 and 12 and the portion for containing the material not to be heated 13 forms sealed apertures completely isolated with each other. Especially, at the isolating wall 14 between the first container 11 and the second container 12, and at the isolating wall 14 between the second container 12 and the portion for containing the material not to be heated 13, high sealing performance is ensured due to the respective attachment of tile partition ribs 17a and 17b of the lid I to the concavities 18 and 18 of the container 3.

Now, upon using the heating device constituted as described above, cooked rice A, and other articles of food B and C are placed in each container 11, 12 and 13, respectively, after the container 3 is placed in the container 2, then, the lid 1 is placed on the upper surface of the container 2. Upon eating the contained foods A, B and C, for example, a few hours later, the portion for containing the exothermic material 4 provided inside of the heating device is operated and among the foods described above, only tile foods A and B contained in the portions for containing the materials to be heated 11 and 12, respectively, are heated.

The heating process of the above-mentioned heating device is explained.

The tear element 7 extending outside of the container 2 is pulled until the mark 9 showing the limit of the length to be pulled is seen from the outside.

Then the water bag 5b in the portion for containing the exothermic material is torn and water contained therein touches calcium oxide contained in the exothermic material bag 5a, which causes calcium oxide to vigorously generate heat together with the vapor of high temperature due to the hydration reaction.

Moreover, at this time, as the water bag 5b is provided below the exothermic material bag 5a and a number of small holes are provided on the exothermic material bag 5a, water in the water bag 5b permeates upward through the small holes of the exothermic material bag 5a due to capillary phenomena, resulting in uniform and gradual contact with water and the whole calcium oxide inside of the exothermic material bag 5a. Accordingly, the process of heat generation of calcium oxide is highly effective and its duration time is long.

The vapor of high temperature is sent to the portions for containing the materials to be heated 11 and 12 in the container 3 through the filter material 8 of the insulation container 6, and then through the apertures 15, 16 in the container 3, thus heating the foods A and B in the containers 11 and 12 together with the conductive heat transferred through walls of the container 3.

Thus, as the vapor of high temperature spouts not only from downward but also from upward, the rice A contained in the first container 11 is heated both from the top and bottom.

Still, the food C in the container for the material not to be heated 13 is not heated, as the container for the material not to be heated 13 in the container 3 is provided away from the heating device and further the partition rib 17b attaching to the concave 18 of the partition wall 14 of the container 3 is provided.

The vapor of high temperature is filtered by the filter material 8 so that it enters the containers for the materials to be heated 11 and 12 only after impurities such as calcium oxide and calcium hydroxide generated by the reaction of calcium oxide and water have been removed, whereby decrease in tastes of the rice A and the articles of food B by the impurities is prevented.

Further, the vapor in the first container 11 and that in the second container 12 are not mixed, which prevents the vapor reeking of the articles of food B from contacting with the rice A and vice versa, thus preserving the tastes from decreasing with the mixture of the smells.

As only the rice A and the articles of food B which increase their tastes when they are hot are heated, and the articles of food C which increase their tastes when they are cold remain cold, a more tasty meal can be obtained.

The present invention can also be utilized as a heating device for heating retort-packed food contained in a bag made of aluminium or instant food cooked only by heating and so on, other than as a lunch box as described in the preferred embodiment I.

Moreover, the heating device may be constituted in such a way in which while providing the apertures 15, 16 spouting the vapor in the first container 11, such apertures are not provided in the second container 12, so that the articles of food 9 are heated without using the vapor. In this case, if the container 3 is made of aluminum, it is possible to appropriately bake the articles of food B in the second container 12.

FIGS. 6 to 10 show a heating device according to the preferred embodiment II of the present invention.

In the above-mentioned heating device according to the preferred embodiment I, the lid 1 is a sealing lid and therefore, if the vapor the volume of which is more than that of the portions for containing the materials to be heated 11 and 12 enters the containers 11 and 12, heating of the materials to be heated may be done insufficiently, or the tastes of food may be decreased because of dew of the vapor attaching to or permeating into the material to be heated. Further, in the case in which the sealing between the container and the lid is not appropriate, the vapor of high temperature may spout from a aperture between the container and the lid, or the lid may be blown off.

Accordingly, as shown in FIG. 6, a small cut 19 is provided on a lid 1 of the heating device according to the preferred embodiment II, so that the vapor in excess of the volume of the portion for containing the material to be heated in the container is gradually discharged through the cut 19 to the outside, thus inside of the container is always kept filled with the vapor of high temperature newly generated.

Moreover, a state of heating inside of the portion for containing the material to be heated can be detected from the vapor being discharged from the cut 19.

In the case in which the portion for containing the material to be heated is divided into some parts, such cut 19 is not required to be provided at the lid corresponding to the container on which the vapor remained therein or the dew generated do not have any adverse effect.

Such cut 19 may be provided at the lid corresponding to the container for the material not to be heated. By providing the cut 19 at such a location, even if the vapor enters the container f or the material not to be heated as a result of deformation or a damage of the isolating wall between the portion for containing the material to be heated and the portion for containing the material not to be heated, the vapor can be discharged.

Plurality of the cuts 19 may be provided at every location corresponding to the partitioned portions for containing the material to be heated, so that the vapor having entered the portions for containing the material to be heated can be discharged in a short time.

FIG. 7 shows a longitudinal sectional view of the cut 19. As shown with two-dot chain lines, the cut may be lifted upward. In this case, as an opening for discharge of the vapor is made bigger, the vapor in the portion for containing the material to be heated is discharged in a shorter time.

In the case as shown in FIG. 6, the cut has a V-shape, but a variety of shapes can be considered as shown in FIGS. 8 to 10.

A cut shown in FIG. 8, for example, has an U-shape, a cut shown in FIG. 9 has approximately a trapezoid-shape, and a cut shown in FIG. 10 approximately has a rectangular shape.

As described above, according to the present invention, in a heating device with use of heat of hydration reaction between an exothermic material and water spattering of the exothermic material on the hydration reaction can be avoided.

Further, the heating device according to the present invention can be produced as a cartridge-type one which contains an exothermic material bag and a water bag, so that such a device can be utilized as a heating source which is applicable to any heating apparatus.

The heating device according to the present invention is, therefore, made simple but increases its uses compared to a conventional heating device utilizing heat of hydration reaction with limited uses.

Thus, the heating device according to the preferred embodiment III can also be applied to the material to be heated, such as the "instant baked noodle", which requires to add a small quantity of water upon heating.

A heating device 21 comprises a container 22, a container for contents of food 23 placed in the container 22 and an insulation container 24, with a material to be heated D contained in the container 23 and an exothermic material contained in the insulation container 24.

The container 22 made of styrene foam is an approximately square box with its upper surface released, to which the container 23 is attached at an opening 22a of the upper side and the insulation container 24 is placed on a flat bottom wall 22b. An edge portion 22c is formed around the periphery of tho opening 22a, to which an engagement part 23c of the container 23 is engaged. The inner diameter of the container 22 is slightly larger than the outer diameter of tile container 23 so that apertures G1 are produced between side walls 22d and 23g of the container 22 and the container 23. Further, although an illustration is omitted, an end of the edge portion 22c is formed slightly irregularly so that a small aperture G2 is formed between the end of the edge portion and the end of the edge of the engagement part 23c, which makes it possible to lead the atmosphere to the side of the insulation container 24 through this small aperture and then, through the aperture G1.

The container is also approximately square, with an opening 23a at the upper surface thereof, and is made of plastic in a body. While a material to be heated such as the "instant baked noodle" is placed on a bottom wall 23b, a lid 26 as will be explained later is set at the engagement part 23c provided around the outside periphery of the container 23 to cover the opening 22a. Further, a fixing rib 23d is fixed in the engagement part 23c around the whole periphery at a certain interval. The bottom wall 23b has a wavy surface to have a larger surface area so that heat conduction is performed effectively. A number of apertures 23e and 23f in a slit-shape are formed at the concavities and the convexities of the bottom wall 23b, respectively, so that while water poured in the container 23 Is dropped in the direction of the insulation container 24 through the aperture 23c at the bottom, the vapor of high temperature generated by the hydration reaction is spouting in the direction of the container 23 through the apertures 23e and 23f.

The insulation container 24 has a dish-shape, which contains an exothermic material 25, which will be described later, and prevents the exothermic material 25 and the container 22 from directly contacting with each other, so as to avoid the melting or transformation of the main body of the container by the heat generated from the exothermic material 25. As the exothermic material 25, such materials which generate heat by hydration reaction is calcium oxide and so on are used. In the preferred embodiment III, a certain amount of calcium oxide necessary to cook tile material to be hosted D is filled in a nonwoven fabric having good water absorption, and then placed and contained in the insulation container 24. Further, the amount of calcium oxide to be filled is set tn advance according to the content of food, and the temperature of heat is adjustable in the range of about 103° C. to 330° C.

A lid 26 having an equal diameter with an outside diameter of the container 23 is made of plastic, and at the edge of the outside periphery thereof, an engagement part 26a is formed so that by engaging it to the engagement part 23c of the container 23, the respective opening, 22, and 23a of the containers 22 and 23 are covered, which makes the container 23 a sealed aperture E.

A quantity of water to be added to the exothermic material 25 may be predetermined as much as required to cook the food to be contained in the container 23 and it may be indicated at a side of the lid 26 or of the container 22 or, as shown in FIG. 12, a cup of a fixed quantity such as a folding paper cup may be provided and placed in the folded state on the upper surface of the lid 26 and so on. Owing to this, proper hydration reaction with the exothermic material 25 takes place, thus avoiding uneven heating of food due to excess and deficiency of the quantity of water, and decrease in tastes due to insufficient heating.

Cooking upon using the heating device constituted as described above for cooking the dried noodles of the "instant baked noodles" is explained next.

The lid 26 having placed on the container 23 is removed and, as shown in FIG. 12, water is poured from the upside of the container 23 to the approximately whole surface of the dried noodles in a scattering way and then the opening 23a of the container 23 is immediately covered with the lid 26 again. Water having poured into the dried noodles adds proper moisture to the dried noodles, thus some water loosening the dried noodles. However, most water is gathered at the concavities of the bottom wall 23b of the container 23 to drop through the aperture 23e at each concavity. Then when the dropped water is poured into the approximately whole surface of exothermic material (calcium oxide), the exothermic material 25 generates heat vigorously due to the hydration reaction of the exothermic material, generating the vapor of high temperature. At this time, an air supply to the exothermic material is made through the aperture G1 and the small aperture G2.

The vapor of high temperature is generated for a minute or two, raising up through the respective apertures 23e and 23f of the convexities and the concavities at the bottom wall 23b, and is filled in the container 23.

Due to this, the noodles are sufficiently heated and baked as baked in a casserole. As a cooking time varied with quantities of the exothermic material 25 and a quantity of water is predetermined according to a variety and a quantity of dried noodles, after a predetermined time, for example five minutes, passes, the generation of the vapor of high temperature is stopped upon eating and the temperature drops to about 100° C. with the completion of cooking. Therefore, the noodles are cooked in a state in which there is little water on the surfaces of the noodles, resulting in a good taste which can not be obtained from noodles heated by hot water. Moreover as described above, quantities of the exothermic material (calcium oxide) 25 and water are properly set in advance, the generation of the vapor of a high temperature completes in a short time of one minute or two, and thus prevention against an unusually high temperature is ensured. Further, even if some vapor leaks, through the aperture G1 and the small aperture G2, to the outside of the body of the container, as the edge of the engagement part 23c of the container 3 is directed downward, the vapor would be dispersed, thus prevention against danger of a scald is ensured. Even if tho heating container 1 is discarded after the meal, due to the decrease in the temperature of the container after the heating, a problem of a fire does not arise.

The heating device has an approximate square-shape suitable for cooking noodles, however, according to a variety of food, it may be round or rectangular just like a lunch box. A variety of cooked food is not limited to the dried noodles such as the "instant baked noodles", but broadly general food may be cooked.

INDUSTRIAL UTILITY

As described above, according to the present invention, a heating device with use of heat of hydration reaction with an exothermic material and water can add vapor of a high temperature generated by the heat to a material to be heated there below, in addition to conductive heat transferred through a wall of a container for the material to be heated, thus making it possible to effectively heat the material to be heated.

The heating device according to the present invention is, therefore, made simple but increases its uses compared to a conventional heating device utilizing heat of hydration reaction with limited uses.

The invention being thus described, it will be obvious that the same may be varied in many ways. Such variations are not regarded as a departure from the spirit and scope of the invention, and all such modifications as would be obvious to one skilled in the art are intended to be included within the scope of the following claims.

What is claimed is:

1. A steam direct heating device comprising:
   a heating container for generating a hot steam by an exothermic reaction sufficient to heat a cooked food and a food container housing the cooked food to be heated, having apertures in a portion of a bottom wall thereof for passing the hot steam and being positioned over the heating container, wherein the heating container has an opening on an upper side thereof;
   a first bag containing calcium oxide as exothermic materials and a second bag containing water, the first and second bags being located in the container and the first bag being positioned over the second bag;
   a sheet-type filter provided over the opening of the container, the filter preventing exothermic materials from leaving the container; and
   means for exposing the exothermic materials in the first bag to water in the second bag to thereby start an exothermic reaction releasing a high temperature steam, the steam passing through the sheet-type filter but the exothermic materials being prevented from passing through the filter even when the exothermic materials are conveyed by water splashing in the exothermic reaction.

2. The heating device as recited in claim 1, wherein the means for exposing comprises a tear element for tearing at least one of the first and second bags.

3. The heating device as recited in claim 2, wherein the tear element has a tape-shape, the tear element is affixed to the second bag so that pulling of the tear element opens the second bag, the tape-shape tear element having a portion extending outside of the heating device.

4. The heating device as recited in claim 1, further comprising a removable lid positionable on the heating device.

5. The heating device as recited in claim 4, wherein the lid has slits through which the vapor in the material container can be vented.

6. The heating device as recited in claim 5, wherein the material container is divided by a plurality of partitions into a plurality of material portions, the material portions being generally separated from one another, the lid having ridges therein for engaging the partitions and separating the material portions.

7. The heating device as recited in claim 6, wherein the ridges have partition ribs defined therein, the ribs aiding in separating the material portions, the ribs being engageable with the partitions.

8. The heating device as recited in claim 7, wherein at least one of the partitions has a slit-shaped aperture defined therein, the at least one partition being hollow and extending above the container with the first and second bag, vapor from the exothermic reaction travels through the at least one hollow partition and exits through the slit-shaped aperture such that material in at least one material portion adjacent the at least one hollow partition is heated by the vapor from above and from below.

9. The heating device as recited in claim 8, wherein the partition ribs on the lid engage the at least one hollow partition on one side of the slit-shaped aperture such that vapor can escape to the one material portion on an aperture side of the at least one hollow partition but vapor will fail to pass from the slit-shaped aperture to a second material portion on the other side of the at least one hollow partition.

10. The heating device as recited in claim 9, wherein the material container has a plurality of engagement ribs around a periphery thereof, the engagement ribs being engageable with the lid.

11. The heating device as recited in claim 1, wherein the material container is divided by a plurality of partitions into a plurality of material portions, some of the material portions having the apertures in a bottom thereof such that material therein is heated by the vapor and some of the material portions failing to have the apertures such that material therein fails to be heated by the vapor.

12. The heating device as recited in claim 11, wherein the partitions are generally hollow, at least one of the partitions being located above the container having the first and second bags while at least one second partition is spaced from the container having the bags, vapor from the exothermic reaction traveling through the at least one partition above the container having the bags while vapor fails to travel through the at least one second partition.

13. The heating device as recited in claim 12, wherein the at least one second partition acts as an insulator between a material portion with apertures on the bottom thereof and a material portion without apertures on the bottom thereof.

14. The heating device as recited in claim 1, wherein the material container is divided into a plurality of material portions by at least one hollow partition, at least one of the partitions being located above the container having the first and second bags such that vapor from the exothermic reaction can travel therethrough, the at least one partition having an aperture on an upper end thereof for escape of the vapor.

15. The heating device as recited in claim 1, wherein the bottom wall of the material container has a wavy shape.

16. The heating device as recited in claim 1, wherein the material container and the container having the first and second bags are readily detachable from the heating container.

* * * * *